(12) United States Patent
Luschek et al.

(10) Patent No.: US 11,143,105 B2
(45) Date of Patent: Oct. 12, 2021

(54) MOUNTING ASSEMBLY AND FAN CASING ASSEMBLY

(71) Applicant: UNISON INDUSTRIES, LLC, Jacksonville, FL (US)

(72) Inventors: Bernard Albert Luschek, Lebanon, OH (US); Dennis Alan McQueen, Miamisburg, OH (US); Derek Thomas Dreischarf, Bellbrook, OH (US); Michael Ralph Storage, Beavercreek, OH (US)

(73) Assignee: Unison Industries, LLC, Jacksonville, FL (US)

( * ) Notice: Subject to any disclaimer, the term of this patent is extended or adjusted under 35 U.S.C. 154(b) by 152 days.

(21) Appl. No.: 16/225,063

(22) Filed: Dec. 19, 2018

(65) Prior Publication Data

US 2020/0200087 A1    Jun. 25, 2020

(51) Int. Cl.
| | |
|---|---|
| *F01D 25/24* | (2006.01) |
| *F02C 7/18* | (2006.01) |
| *F02C 7/14* | (2006.01) |
| *F01D 25/12* | (2006.01) |
| *F02K 3/06* | (2006.01) |
| *F02C 7/32* | (2006.01) |

(52) U.S. Cl.
CPC ............... *F02C 7/18* (2013.01); *F01D 25/12* (2013.01); *F01D 25/243* (2013.01); *F02C 7/14* (2013.01); *F02C 7/32* (2013.01); *F02K 3/06* (2013.01); *F05D 2260/20* (2013.01)

(58) Field of Classification Search
CPC ........ F01D 25/14; F01D 25/243; F01D 25/28; F01D 25/24
See application file for complete search history.

(56) References Cited

U.S. PATENT DOCUMENTS

| | | | |
|---|---|---|---|
| 4,830,557 A | 5/1989 | Harris et al. | |
| 5,624,218 A * | 4/1997 | Dauwalter | ............ F16B 39/101 411/373 |
| 5,730,540 A | 3/1998 | Duran et al. | |
| 8,510,945 B2 * | 8/2013 | Hand | .................... F28F 9/0075 29/889.2 |
| 9,732,701 B2 | 8/2017 | Lu | |
| 10,781,846 B2 * | 9/2020 | Gunner | .................... B21K 1/56 |
| 2008/0292425 A1 * | 11/2008 | Pineiros | ................ F16B 37/044 411/92 |
| 2012/0224935 A1 | 9/2012 | Chiu | |
| 2012/0285138 A1 | 11/2012 | Todorovic | |
| 2013/0011246 A1 | 1/2013 | Todorovic | |
| 2013/0154169 A1 * | 6/2013 | Myers | ................... F01D 25/164 267/103 |
| 2016/0090851 A1 | 3/2016 | Carr et al. | |

(Continued)

*Primary Examiner* — Todd E Manahan
*Assistant Examiner* — Thuyhang N Nguyen
(74) *Attorney, Agent, or Firm* — McGarry Bair PC

(57) ABSTRACT

A fan casing assembly for a turbine engine including a fan casing having a peripheral wall, a surface cooler having a first surface confronting the peripheral wall and a mounting assembly having a lower portion generally retained between the first surface of the annular surface cooler and the peripheral wall and having a floating body extending through the set of fan casing fastener openings and an upper portion located radially exterior of the annular fan casing and operably coupled to the lower portion.

19 Claims, 7 Drawing Sheets

(56) References Cited

U.S. PATENT DOCUMENTS

| | | |
|---|---|---|
| 2016/0273770 A1 | 9/2016 | Hanson et al. |
| 2017/0023017 A1* | 1/2017 | Dreischarf ............ F04D 29/661 |
| 2017/0145902 A1 | 5/2017 | Sovine et al. |
| 2017/0335863 A1 | 11/2017 | Dreischarf et al. |
| 2017/0336074 A1 | 11/2017 | Sander et al. |
| 2018/0094545 A1 | 4/2018 | Dale et al. |

* cited by examiner

MOUNTING ASSEMBLY AND FAN CASING ASSEMBLY

BACKGROUND

Contemporary engines used in aircraft produce substantial amounts of heat that must be transferred away from the engine. Heat exchangers provide a way to transfer heat away from such engines. For example, heat exchangers can be arranged in a ring about a portion of the engine.

BRIEF DESCRIPTION

An aspect of the present disclosure relates to a first self-contained assembly, including a washer having a body defining a first side and a second side and including at least one fastener opening extending through the body from the first side to the second side, at least one washer including a peripheral lip and a central hub having a fastener opening, a biasing element located between the second side of the washer and the at least one washer, at least one bushings having an internally threaded section, and at least one fastener having a threaded section, the threaded section configured to pass through the at least one fastener opening, the fastener opening, and be retained in the internally threaded section of the at least one bushing and having a length that passed through the at least one bushing and provides for a pre-load force, at least one second self-contained assembly, including a boss having a body extending from a first distal surface to a second distal surface, a passage extends through the body from the first distal surface to the second distal surface, at least one seat is defined within the passage, and a floating body having a shank and a cap extending from an upper portion of the shank, an internally threaded passage extends through the shank and cap wherein the shank is located within the passage and the cap is configured to abut the at least one seat defined within the passage wherein the threaded section of the at least one fastener can be received and retained in the internally threaded passage of the shank to operably couple the first self-contained assembly and the at least one second self-contained assembly.

Another aspect of the present disclosure relates to a fan casing assembly, including an annular fan casing having a peripheral wall and a set of fan casing fastener openings passing through the peripheral wall, an annular surface cooler having a first surface confronting the peripheral wall, and a mounting assembly having a lower portion generally retained between the first surface of the annular surface cooler and the peripheral wall and having a floating body extending through the set of fan casing fastener openings and an upper portion located radially exterior of the annular fan casing and operably coupled to the lower portion and wherein the mounting assembly is configured to provide a fixed connection for dynamic loading, a flexible connection for thermal loading, and shifting during installation to allow for tolerance mismatch of the annular fan casing and annular surface cooler.

Yet another aspect of the present disclosure relates to a method of mounting two components, the method including placing a first self-contained assembly adjacent a first side of a first component the first self-contained assembly, including a washer having a body defining a first side and a second side and including at least one fastener opening extending through the body from the first side to the second side, a set of washers, each washer of the set of washers including a peripheral lip and a central hub having a fastener opening, a biasing element located between the second side of the washer and each washer of the set of washers, a bushing having an internally threaded section, and a fastener having a threaded section, the threaded section configured to pass through the at least one fastener opening, the fastener opening, and be retained in the internally threaded section of the bushing and have a length that passed through the bushing and provides for a pre-load force from the biasing element, placing at least one second self-contained assembly adjacent a second side of the first component, the at least one second self-contained assembly including a boss having a body extending from a first distal surface to a second distal surface, a passage extends through the body from the first distal surface to the second distal surface, at least one seat is defined within the passage, and a floating body having a shank and a cap extending from an upper portion of the shank, an internally threaded passage extends through the shank and cap wherein the shank is located within the passage and the cap is configured to abut the at least one seat defined within the passage, and threading the fastener into the internally threaded passage of the shank to operably couple the first self-contained assembly and the at least one second self-contained assembly about the first component, wherein the first side of the washer is adjacent the first side of the first component, the first component includes an opening through which the fastener and at least a portion of the shank extends

DETAILED DESCRIPTION

Figure 1:
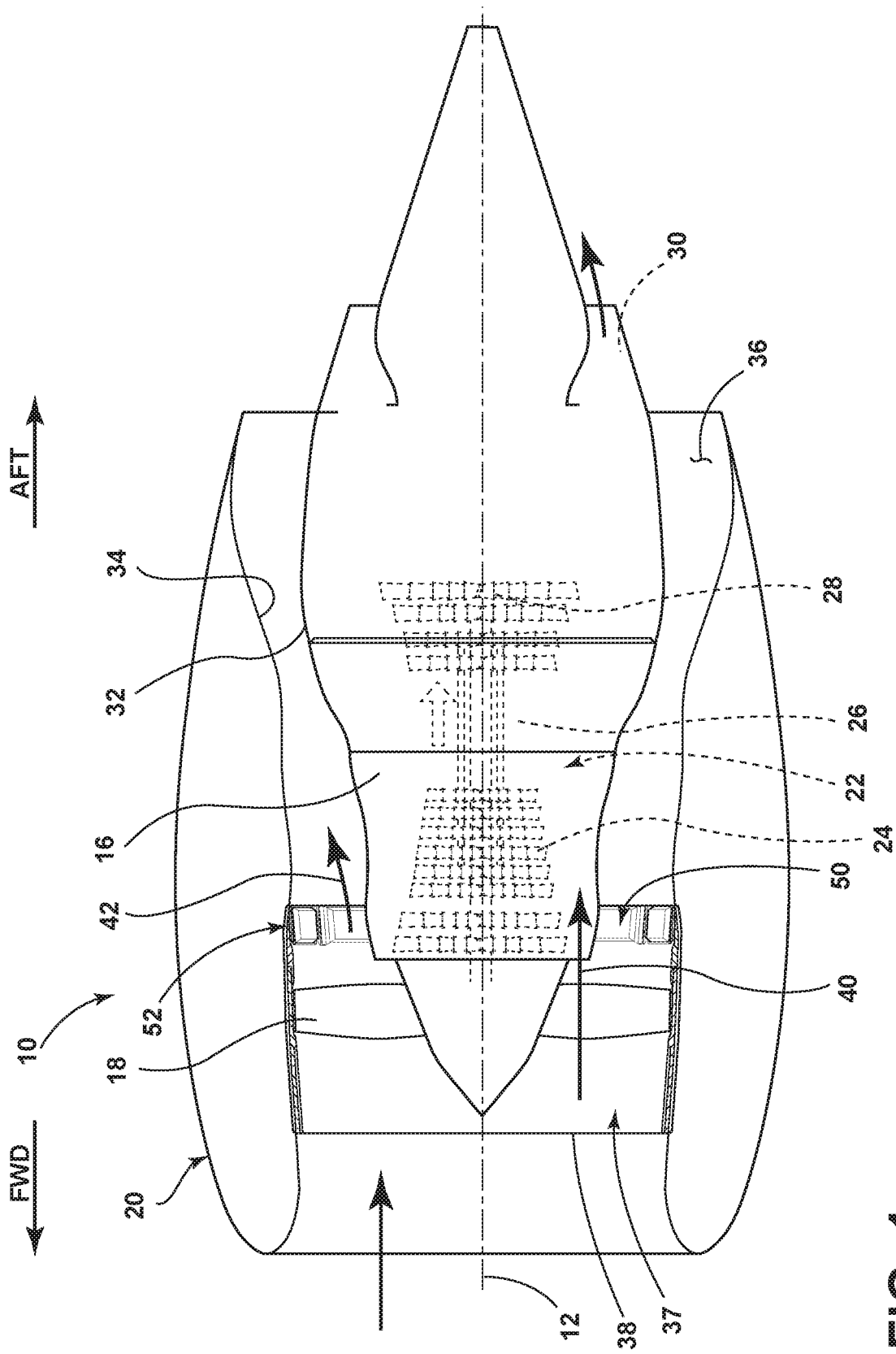
FIG. 1 is a schematic partially cut away view of a turbine engine assembly with a surface cooler and mounting system according to aspects of the present disclosure.

One type of heat exchanger used in an aircraft engine is a surface cooler that is mounted to an aft fan casing. However, the space in this region of the engine is limited and current designs utilize nearly all the available space. As a result, newer engine technologies, which have more heat that must be dissipated, will be thermally constrained due to the lack of space available. The problem is further exacerbated in that new engine designs are becoming further space constrained, making the size and weight of the current types of coolers and their mounting systems prohibitive. An additional problem is that the heat exchangers are subject to relatively high temperatures that cause them to expand thermally, especially laterally or tangential, yet need to remain fixed to the engine to prevent high cycle fatigue from engine vibration. Generally, such heat exchangers are line replaceable units and require servicing while the engine is mounted to the wing of the aircraft. Thus, a mounting system that allows for ease of mounting while still allowing for thermal growth and providing the desired stability is necessary.

Aspects of the present disclosure generally relate to surface coolers and more particularly to systems for mounting the surface coolers in an engine such as an aircraft engine. The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, and water turbines. Further still it will be understood that aspects of the present disclosure can have applications in heat exchangers requiring large assembly tolerances, heat exchangers with difficult assembly kinematics, or heat exchangers requiring fixed for high cycle fatigue but allowing differential thermal growth for low cycle fatigue.

While "a set of" various elements will be described, it will be understood that "a set" can include any number of the respective elements, including only one element. As used herein, the terms "axial" or "axially" refer to a dimension along a longitudinal axis of a component or along a longitudinal axis of the component. All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Thus, referring to FIG. 1, a brief explanation of the environment in which aspects of the present disclosure can be used is described. More specifically, FIG. 1 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing 37 having an annular forward casing 38 and an annular aft casing 52 can form a portion of the outer cowl 34 formed by the nacelle 20 or can be suspended from portions of the nacelle 20 via struts (not shown).

In operation, air flows through the fan assembly 18 and a first portion 40 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 42 of the airflow discharged from fan assembly 18 around engine core 22.

Figure 2:
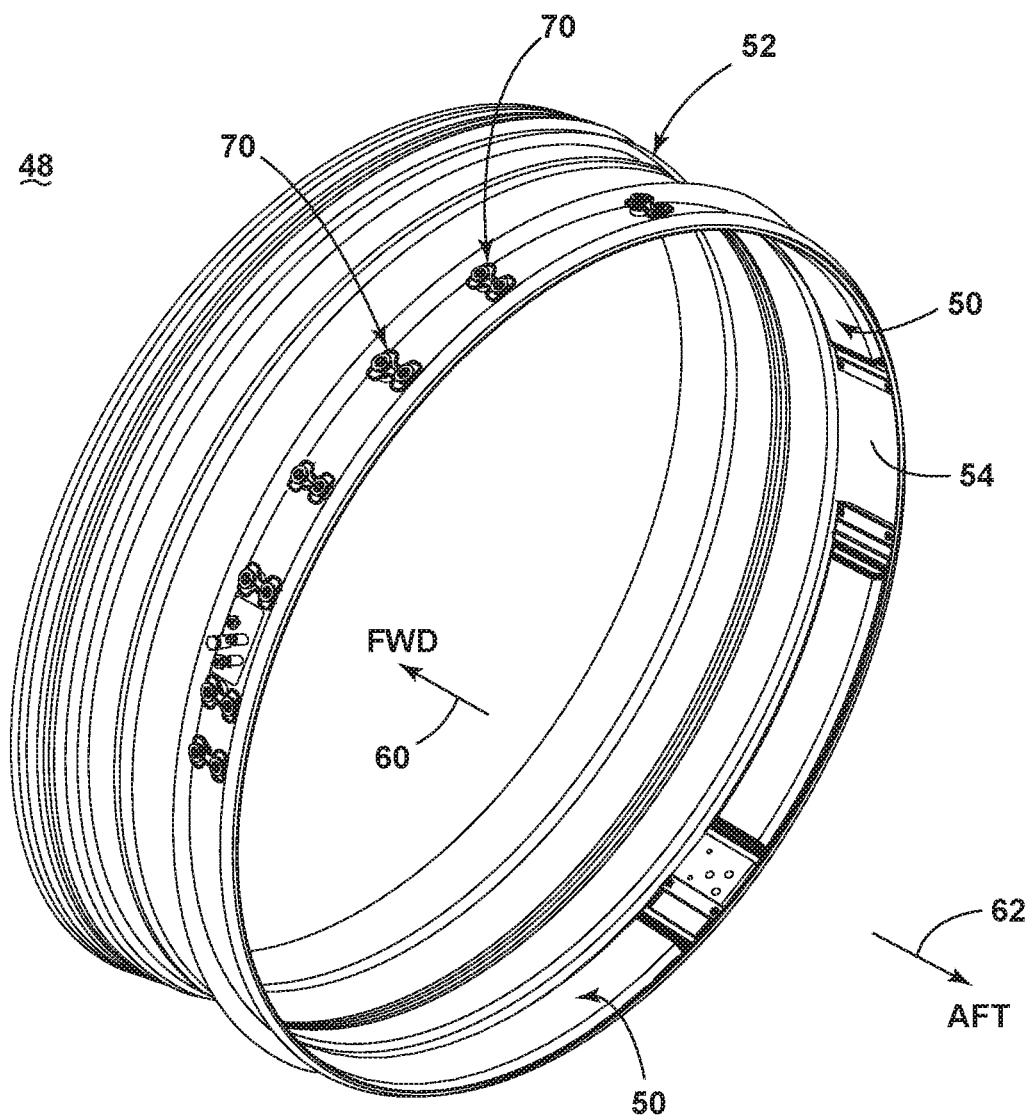
FIG. 2 is a perspective view of an aft portion of a fan casing, a surface cooler, and mounting assemblies that can be included in the turbine engine assembly of FIG. 1.

The turbine engine assembly 10 can pose unique thermal management challenges and a heat exchanger or surface cooler 50 can be attached to the turbine engine assembly 10 to aid in the dissipation of heat. The surface cooler 50 is an annular surface cooler that can be operably coupled to an annular aft casing 52 having a peripheral wall 54 (FIG. 2) that forms an interior portion of the outer cowl 34. The surface cooler 50 can include, but is not limited to, an air-cooled heat exchanger that is positioned within the annular passage 36. While the surface cooler 50 has been illustrated as being downstream of the fan assembly 18 it is also contemplated that the surface cooler 50 can alternatively be upstream from fan assembly 18. As such, it will be understood that the surface cooler 50 can be positioned anywhere along the axial length of the annular passage 36. The annular aft casing 52 and surface cooler 50 can form a portion of a fan casing assembly 48 as illustrated in FIG. 2 with a forward direction, indicated by arrow 60, and an aft direction, as indicated by arrow 62 for reference.

Figure 3:
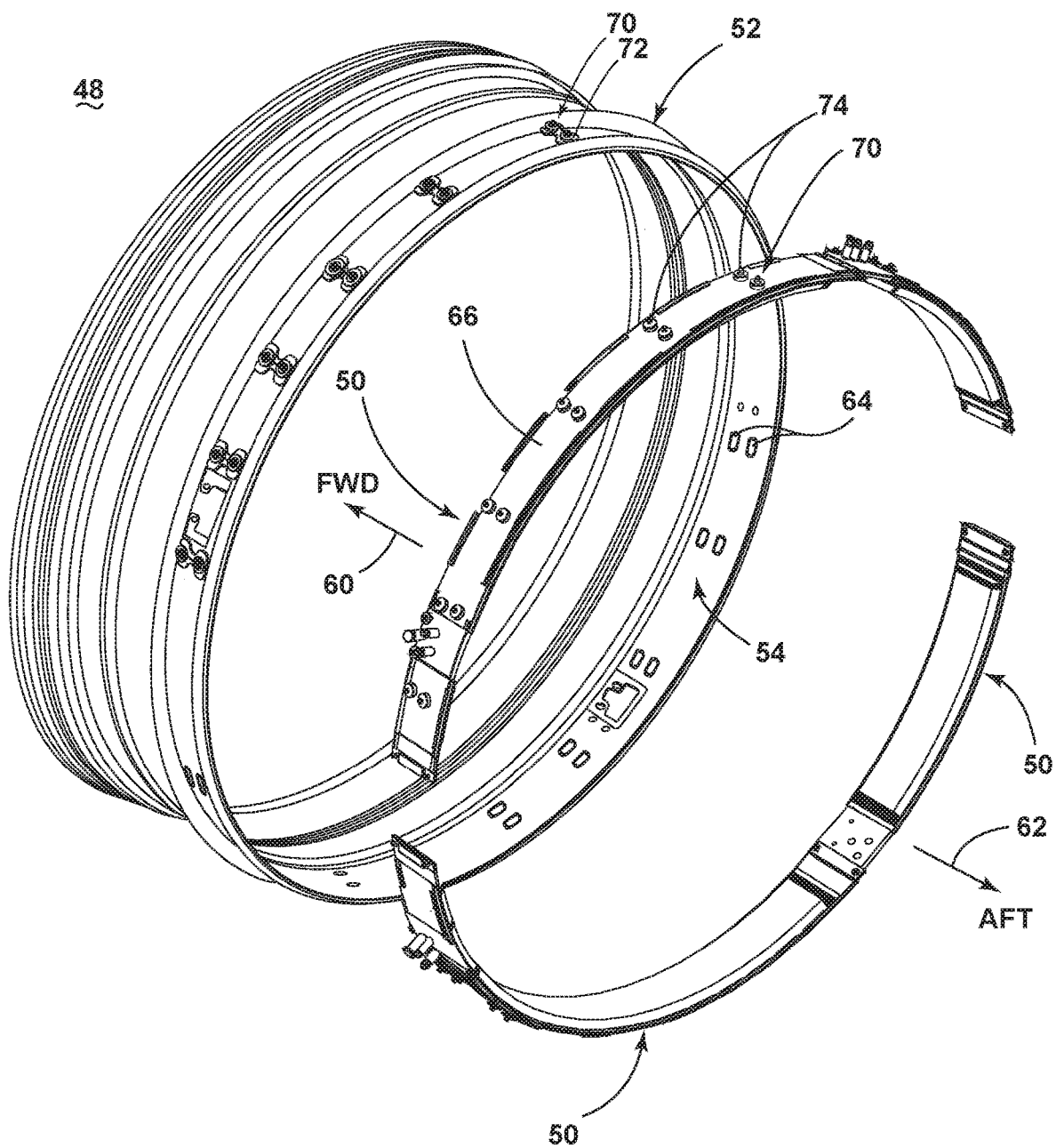
FIG. 3 is a partially exploded perspective view of the portion of the fan casing, surface cooler, and various mounting assemblies of FIG. 2.

The partially exploded view of FIG. 3 better illustrates that fan casing fastener openings 64 pass through the peripheral wall 54 of the annular aft casing 52. A first surface 66 of the surface cooler 50, when the fan casing assembly 48 is assembled, confronts the peripheral wall 54. The surface cooler 50 can include a circumferential and axial profile that is substantially similar to the circumferential and axial profile of the peripheral wall 54. The surface cooler 50 can cover any portion of the circumference of the peripheral wall 54. It will be understood that a set of surface coolers 50 can be utilized to cool a single turbine engine assembly 10. It will be understood that "a set" as used herein can include any number including only one.

A set of mounting assemblies 70 (FIG. 2) can be utilized to operably couple the aft casing 52 and each surface cooler 50 mounted thereto. The mounting assembly 70 can act as a rigid constraint in dynamic loading and act as a flexible member in thermal loading. An upper portion 72 of the mounting assembly 70 can be located radially outward of the aft casing and a lower portion 74 of the mounting assembly can be located between the aft casing 52 and the surface cooler 50.

Figure 4:
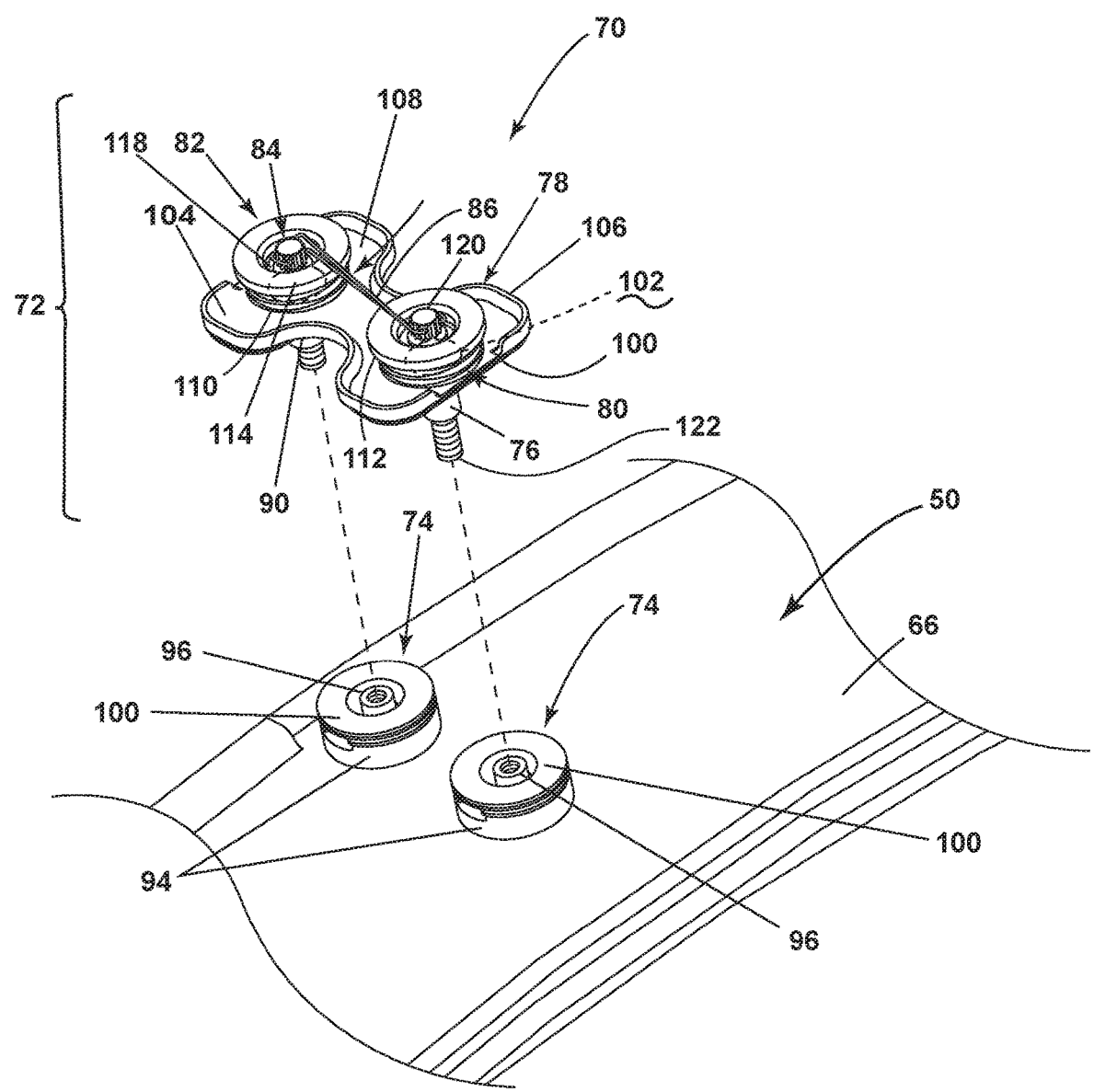
FIG. 4 is an enlarged perspective view of a portion of the surface cooler and partially exploded mounting assembly of FIG. 2.

FIG. 4 illustrates the exemplary mounting assembly 70 more clearly, the aft casing 52 has been removed from the figure, the surface cooler 50 remains for clarity purposes. It is contemplated that the upper portion 72 can be a self-contained assembly including a set of bushings 76, washer 78, at least one biasing element 80, a set of washers 82, bolts 84, and a wire or cable 86. A set of wear attenuators 88 can also be included in the upper portion 72 of the mounting assembly 70 on a first side of the washer 78. Further still, the lower portion 74 can include, by way of non-limiting example, a set of self-contained assemblies each including a wear attenuator 92 (FIG. 6), boss 94, floating body 96, and retention washer 98.

Figure 5:
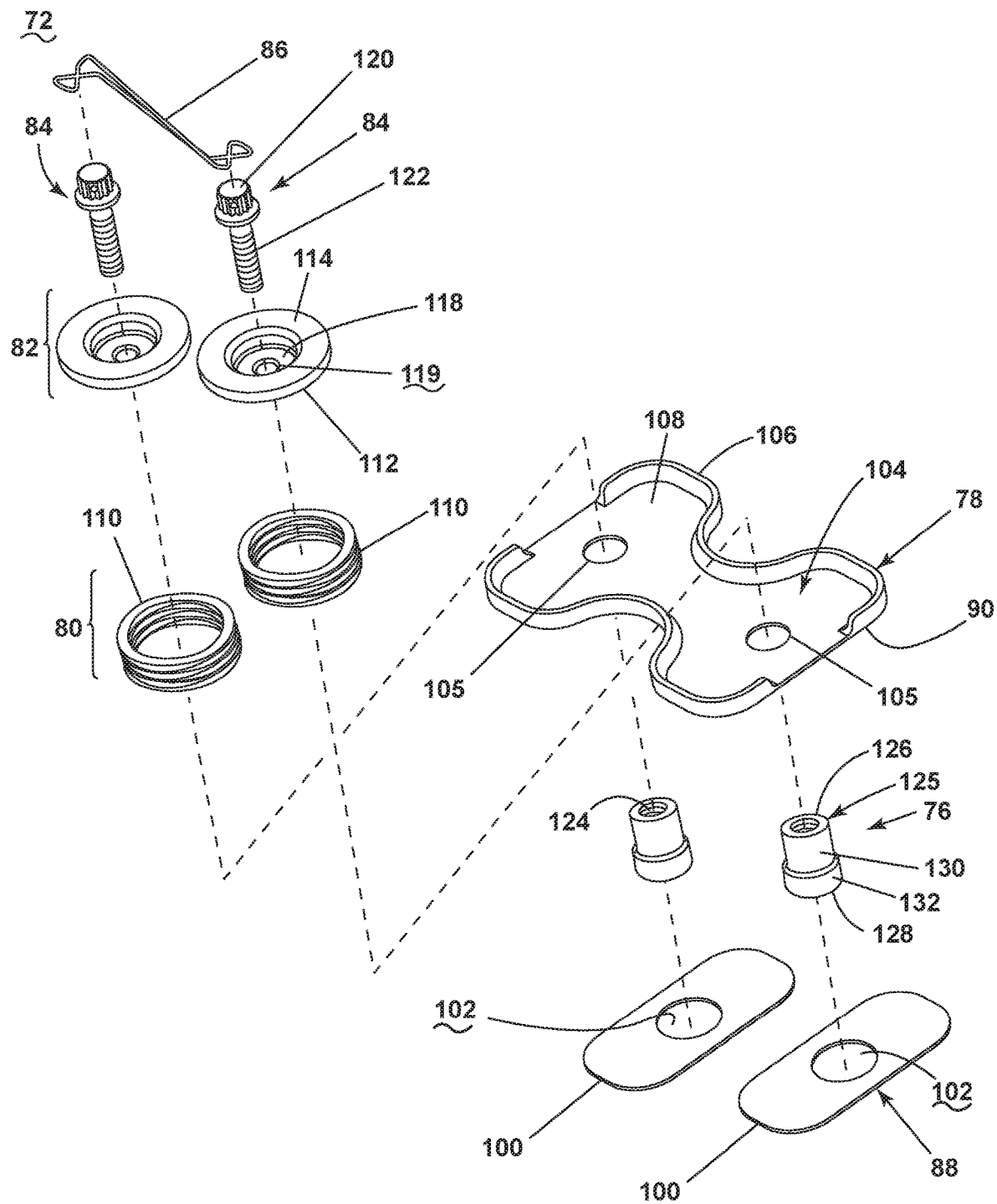
FIG. 5 is an exploded perspective view of an upper portion of the mounting assembly of FIG. 2.

FIG. 5 illustrates the upper portion 72 of the mounting assembly 70 in more detail. As the upper portion 72 lays radially outside of and abutting the aft casing 52 upon assembly a set of wear attenuators 88 can be included on a first side of the washer 78 such that the set of wear attenuators 88 are located between the washer 78 and the aft casing 52 upon assembly. The set of wear attenuators 88 can be retained by or mounted to the washer 78 in any suitable manner including, but not limited to, that the set of wear attenuators 88 can be bonded to the washer 78 such as through adhesive. The wear attenuator 88 can be shaped, sized, or designed in any suitable manner including, but not limited to, that the wear attenuator 88 can be a section of wear material 100 generally having a length of the washer 78 with an opening 102 therein. The wear attenuator 88 can be made from any suitable material including, but not limited to, that the wear attenuator 88 can be a polyether ether ketone molded component.

The washer 78 is generally illustrated as having a body 104. The body 104 can have any suitable size, shape, or geometry and has been generally illustrated in a dog-bone configuration. A set of protrusions 106 extend along at least a portion of a periphery of the body 104 on a second side 108 of the body 104. The second side 108 is opposite a first side 90 where the wear attenuators 88 are located. The set of protrusions 106 generally extend along a majority of the periphery of the body 104 and aid in retention of parts of the upper portion 72 of the mounting assembly 70. The set of protrusions 106 can also aid in providing stiffness or strength to the washer 78. Further still, a set of fastener openings 105 can be located within the body and extend from the first side 90 to the second side 108.

The at least one biasing element 80 can be any suitable biasing element configured to bias the washer 78 and set of washers 82. In the illustrated example, a wave spring 110 forms the particular biasing element being utilized. More specifically, a wave spring 110 can be included for each of the set of washers 82. As two washers 82 are present in the illustrated example a corresponding pair of wave springs 110 are also included.

Each washer 78, in turn, is configured to retain the corresponding wave spring 110 against body 104 of the washer 78. More specifically, a peripheral lip 112 is included in the body 114 of the washer 78. The lip 112 extends about the periphery of the circular washer 78 and creates an interior pocket 116 (FIG. 7) that is sized and configured to retain a distal end of the wave spring 110. Another feature, is that a central hub 118 of the body 114 can be seen as being inset from a remainder of the body 114. A fastener opening 119 is located within the central hub 118 and also inset within the body 114.

A head 120 and threaded section 122 are further illustrated as being included on each of the bolts 84. Further still, the wire or cable 86 can be sized and configured to retain the pair of bolts 84 upon assembly.

Each bushing 76 has an internally threaded section 124 that is sized and configured to receive and retain the threaded section 122 of the bolt 84. A hollow body 125 of the bushing extends from a first end 126 to a second end 128 and the internal threaded section 124 extends a long at least a portion of the hollow body between the first end 126 and the second end 128. Further still, a barrel 130 defines a portion of the hollow body 125 adjacent the first end 126 and a flange portion 132 defines a portion of the hollow body 125 adjacent the second end 128. The flange portion 132 has been illustrated as including a wider periphery although it will be understood that any suitable bushing or fastener can be utilized. In the illustrated example, the barrel 130 is sized to extend through the fastener openings 105 of the washer 78 and the opening 102 of the wear attenuator 88 but is not sized pass through the fastener opening 119 of the body 114 of the washer 82.

To create the contained assembly forming the upper portion 72, the wear attenuator(s) 88 are attached to the body 104 of the washer 78 such that the opening 102 of each wear material 100 is in line with a corresponding fastener opening 105. As mentioned the wear attenuator(s) 88 can be attached in any suitable manner including via adhesive. A first distal end of the wave spring 110 can be placed within the interior pocket 116 of the washer 82 and the second distal end of the wave spring 110 can be placed against the second side 108 of the body 104 of the washer 78. The threaded section 122 of the bolt 84 can be inserted and retained within the fastener openings 119 and the fastener openings 105. The threaded section 122 can then be retained by the bushing 76. This also retains all components in the upper portion 72 including the washer 82, bolt 84, biasing element 80, washer 78 and bushing 76 as well as any attached wear attenuators. It will be understood that the bolt 84 can be inserted and secured until the head 120 abuts the inset central hub 118 of the washer 82. Further still, the bushing 76 can be moved up the threaded section 122 of the bolt 84 such that the wave spring 110 can be tensioned, the first end 126 of the bushing 76 can move in contact with the washer 78, and the bushing 76 can be considered to be pre-loaded. This process can be repeated for the second set of similar parts and once both are attached, the wire or cable 86 can be utilized to further secure the head 120 of the bolts 84. It will be understood that portions of the assembly can be done in any order; for instance, adhering the wear attenuator to the first side 90 of the washer can occur before or after the bolt 84 and bushing 76 are pre-loaded.

Figure 6:
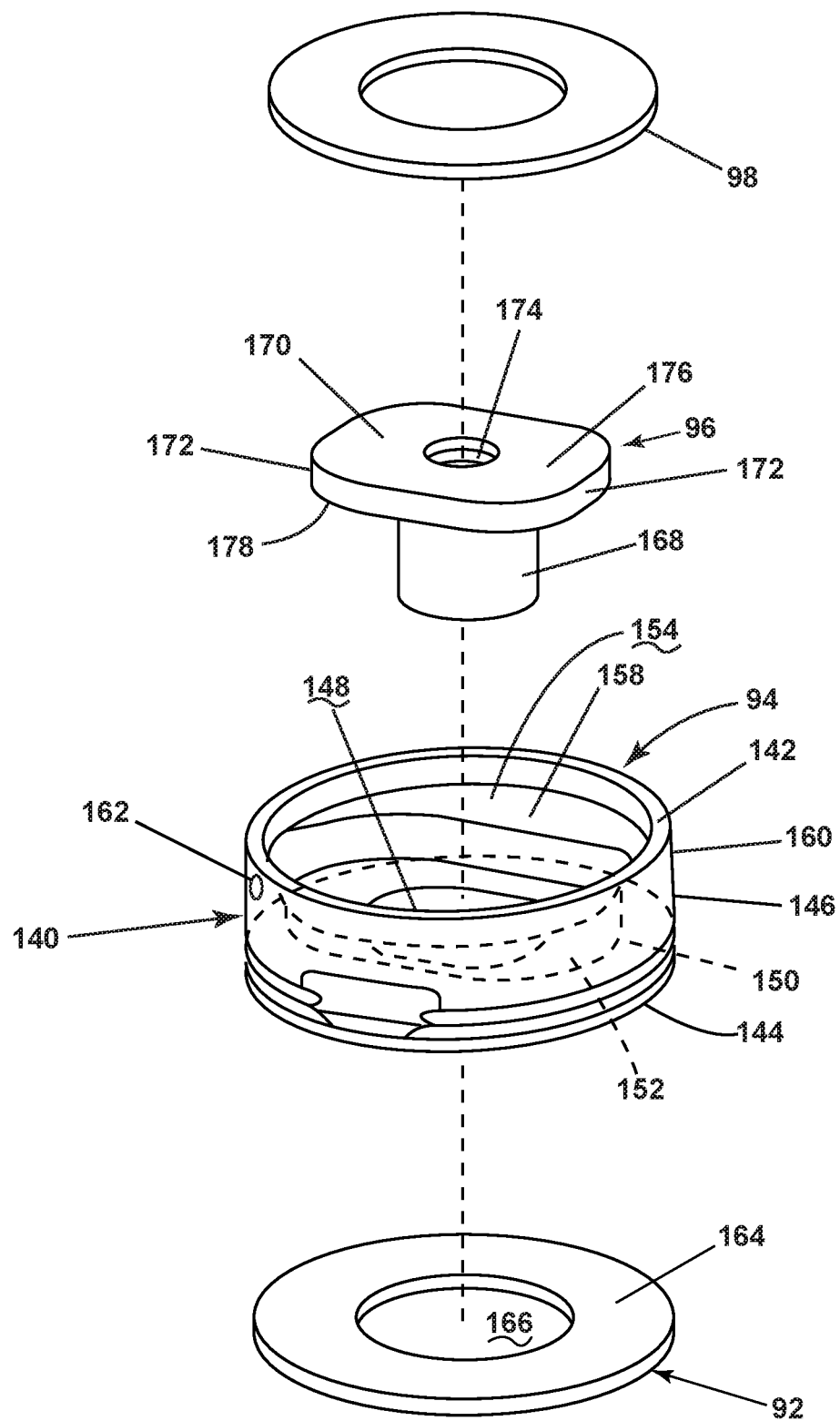
FIG. 6 is an exploded perspective view of a lower portion of the mounting assembly of FIG. 2.

FIG. 6 illustrates the lower portion 74 of the mounting assembly 70 in more detail. It will be understood that the lower portion has been illustrated in an inverted position in FIG. 6 for clarity of internal portions of a body 140 the boss 94. The body 140 includes a first distal surface 142 and a second distal surface 144 joined by a peripheral wall 146. For orientation purposes, it will be understood that the first distal surface 142 is the surface operably coupled to the first surface of the surface cooler 50 (FIG. 4). A passage 148 extends through the body 140 from the first distal surface 142 and the second distal surface 144. A first seat 152 is located at a first height 150 within an interior of the body 140 adjacent the passage 148. The passage 148 from the first seat 152 to the second distal surface 144 defines an axial width 154 (FIG. 7), which is smaller than the axial width 156 (FIG. 7) of a second portion of the passage from the first seat 152 extending towards the first distal surface 142. A second seat 158 is located at a second height 160 within an interior of the body 140 adjacent the passage 148 and located towards the first distal surface 142 from the first seat 152.

It will be understood that the body 140 can be formed in any suitable manner including that it may have any suitable shape, size, profile, or geometry. By way of non-limiting examples, measurements are given below in reference to FIG. 7. Further, still additional features such as a set of weep holes 162 can be included in the boss 94. The set of weep holes 162 can be included in the peripheral wall 146. Any number of weep holes 162 can be included including that multiple weep holes 162 can be spaced about the boss 94 in any suitable manner. The weep holes 162 are configured to allow for coatings including sprayed on coatings or water to exit the interior of the body 140. Further still, the body 140 can be formed of any suitable material or formed in any suitable manner including that it can be an aluminum body. Features thereof can be cast, machined, additively manufactured, or otherwise created.

A wear attenuator 92 can be retained by or mounted on the second distal surface of the boss 94 in any suitable manner including, but not limited to, that the set of wear attenuators 92 can be bonded to the boss 94 such as through adhesive. The wear attenuator 92 can be shaped in any suitable manner including, but not limited to, that the wear attenuator 92 can be a disk 164 with a central opening 166. The wear attenuator 92 can be made from any suitable material including, but not limited to, that the wear attenuator 92 can be a polyether ether ketone molded component.

A shank 168 and cap 170 having two wings 172 extending from an upper portion of the shank 168 form the floating body 96. In the illustrated example, the shank 168 is illustrated as hollow and having an internally threaded passage 174 that extends through an upper surface 176 of the cap 170. The lower surface 178 of the cap 170 formed by the wings 172 can rest on the second seat 158. The size of the shank 168 and the wings 172 can be sized such that the shank 168 is smaller than the axial width 154 of the passage 148 of the boss 94 and can therefor move therein. Similarly the wings 172 can be sized such that they do not extend across the interior of the body 140 of the boss 94 and can allow for the shank 168 to move. The floating body 96 can be formed in any suitable manner including that it may have any suitable shape, size, profile, or geometry, which should correspond to that of the boss 94 and allow the floating body 96 to move at least axially there within. Further still, the floating body 96 can formed of any suitable material or formed in any suitable manner including that it can be an a stainless steel floating body.

The retention washer 98 can be located within the interior of the body 140 of the boss 94. More specifically the retention washer 98 can be received at the second height 160 either within the second seat 158 or on top of the second seat 158. The retention washer 98 can be formed in any suitable manner including that the retention washer can be an aluminum retention washer.

It will be understood that the lower portion 74 of the mounting assembly 70 is also self-contained. To create the contained assembly forming the lower portion 74, the wear attenuator 92 is attached to the body 140 of the boss 94 such that the opening 166 of the wear material 100 is in line with a corresponding fastener opening passage 148. As mentioned the wear attenuator 92 can be attached in any suitable manner including via adhesive. The floating body 96 can then be located within the body 140 such that the shank 168 extends through the second distal surface 144 and the wear attenuator 92. The retention washer 98 can then be located adjacent the second seat 158 and mounted to the boss 94. It will be understood that the retention washer 98 can be mounted or fastened via any suitable means including, but not limited to, that the retention washer 98 can be clipped or welded into place. The retention washer 98 keeps the floating body 96 presented for receipt of the attachment bolts 84.

Figure 7:
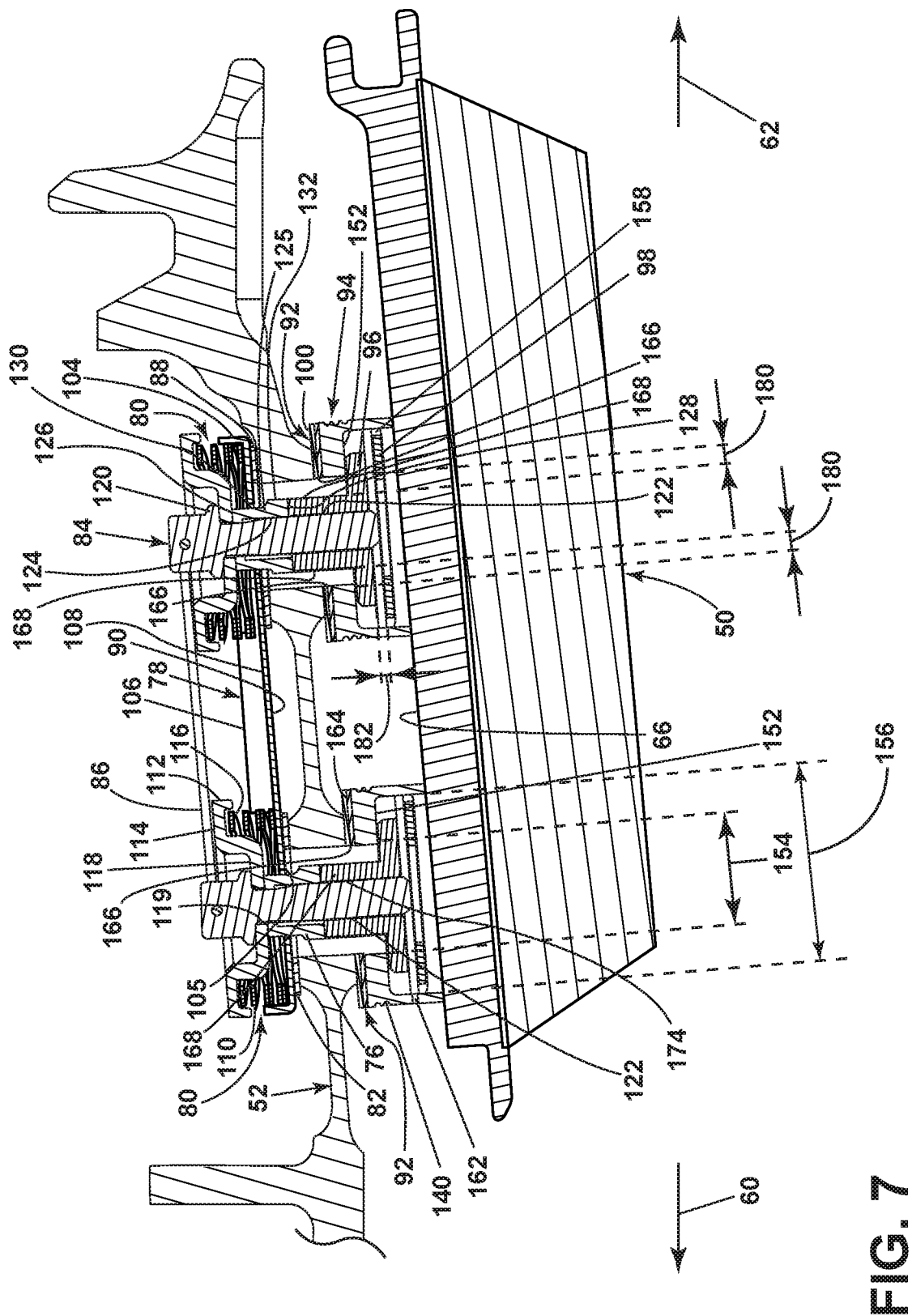
FIG. 7 is a cross-sectional view illustrating a portion of the fan casing, surface cooler, and mounting assembly of FIG. 2.

The lower portion 74 of the mounting assembly 70 can then be mounted to the surface cooler 50. More specifically the first distal surface 142 of boss 94 can be attached to the first surface 66 of the surface cooler 50 as illustrated in FIG. 7. By way of non-limiting examples it is contemplated that the boss 94 can friction welded or braised onto the first surface 66 of the surface cooler 50. In the illustrated example the dog-bone shape of the body 104 allows it to overlie two bosses 94. Thus, it will be understood that the lower portion 74 of the mounting assembly 70 includes a set of two self-contained assemblies and that both bosses 94 of the lower portion 74 would be mounted at this time.

The surface cooler 50 can then be positioned such that the first surface 66 confronts the peripheral wall 54 of the aft casing 52. In such an instance, the shank 168 of the lower portion 74 of the mounting assembly 70 should be aligned to correspond to the fan casing fastener openings 64. The peripheral wall 54 of the aft casing 52 can then be brought into contact and mounted to the wear attenuator 92. It will be understood that the disk 164 can have a double sided adhesive and thus also be configured to adhere to the fan casing 52. It is contemplated that the set of wear attenuators 88 of the upper portion 72 of the mounting assembly 70 can also be mounted to the aft casing 52 in any suitable manner, including such as through adhesive. The wear attenuators 88 and 92 allow for sliding and less wear between the mounting assembly 70 and the fan casing 52. When the wear attenuators 88 are operably coupled to the fan casing 52 it will be understood that the bushings 76 and bolts 84 will also be aligned to correspond to the fan casing fastener openings 64. As illustrated, the threaded section 122 of the bolt 84 can be threaded into the internally threaded passage 174 of the floating body 96. In this manner the lower portion 72 and the upper portion 74 of the mounting assembly 70 can be coupled together. The bolt 84 can be threaded into the floating body 96 until the second end 128 of the bushing 76, which is already pre-loaded, abuts the shank 168 of the floating body 96. The wings 172 of the floating body 96 are anti-rotated against the interior profile of the body 140 during torque application to the bolt 84.

In this manner, an aspect of the present disclosure can include a method of mounting the surface cooler 50 to the fan casing 52 utilizing the mounting assembly 70. One benefit of the mounting assembly 70 includes that when the floating body 96 is centered in the boss 94 there is 2.03 mm (0.08 inch) (annotated with arrows 180) on either side of the shank 168 along for axial float within the axial width 154 of the passage 148 of the boss 94. Thus the floating body 96 allows for shifting during installation to allow for tolerance mismatch of the annular aft casing 52 and surface cooler 50. Further still, there is some spacing between an upper surface 176 of the cap 170 and the retention washer 98. Such spacing is illustrated with arrow 182 and can be 1.27 mm (0.05 inch) and allows for lateral movement of the floating mechanism. This can be beneficial during installation and during low cycle fatigue. The mounting assembly provides for allowance for installation flexibility due to a floating allowance between the floating body 96 and body 140 this can also be known as allowing for installation kinematics.

It will be understood that at least a portion of the mounting assembly 70 is located in between the surface cooler 50 and the fan casing 52, which is considered to utilize a shared space and provide benefits because limited space is available around the annular aft casing 52 and surface cooler 50. In FIG. 7, while the surface cooler 50 has been illustrated as being solid it will be understood that any suitable internal flow passages can be located therein.

During operation of the turbine engine assembly 10, the relative thermal delta between the surface cooler 50 and the annular aft casing 52 causes thermally-induced movement between the annular aft casing 52 and surface cooler 50. This movement can result in a relative circumferential movement between the annular aft casing 52 and annular surface cooler 50. In this manner, it will be understood that surface coolers with integrated support mechanisms have very challenging design requirements. The wear attenuators 88 and 92 provide for a low coefficient of friction to allow for such thermal growth. By controlling the component dimensions by tolerance, the amount of preload is controlled to a level that results in a fixed connection for dynamic loading and floating or flexible connection for thermal loading and this is done so within a mounting assembly having upper and lower portions that are self-contained and in a mounting assembly that provides quick and easy manufacturing and attachment for expedited scheduling. Spring loaded upper portion 72 pulls the surface cooler 50 to the annular aft casing 52 with a determined preload.

It will be understood that aspects of the present disclosure provide for a compact and simplified design that provides a variety of benefits including ease of assembly with an attachment mechanism that is self-contained. Further still the mounting assembly is fixed during dynamic loading, based on the determined spring load, but allowed to grow thermally circumferentially and axially. Further still, the floating mechanism allows for axial shift during installation to allow for tolerance mismatch of the surface cooler and fan case. The spring loaded attachment mechanism pulls the surface cooler to the fan case with a determined preload. Wear attenuators having a low coefficient of friction further allow for surface cooler thermal growth. The boss described also includes venting to allow for aluminum parts to be conversion coated. It will be understood that any suitable alternative to mounting assembly can be utilized, one benefit to the exemplary illustrated assembly is that it meets attachment location geometry already defined on the fan case.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mounting assembly, comprising:
   a first self-contained assembly, comprising:
   a washer having a body defining a first side and a second side and including at least one fastener opening extending through the body from the first side to the second side;
   at least one washer including a peripheral lip and a central hub having a fastener opening;
   a biasing element located between the second side of the washer and the at least one washer;
   at least one bushing having an internally threaded section; and
   at least one fastener having a threaded section, the threaded section configured to pass through the at least one fastener opening, the fastener opening, and be retained in the internally threaded section of the at least one bushing and having a length that passed through the at least one bushing and provides for a pre-load force;
   at least one second self-contained assembly, comprising:
   a boss having a body extending from a first distal surface to a second distal surface, a passage of the boss extends through the body of the boss from the first distal surface to the second distal surface, a first seat is defined within the passage;
   a floating body having a shank and a cap extending from an upper portion of the shank, an internally threaded passage extends through the shank and cap, the shank located within the passage at a first side of the cap configured to abut the first seat defined within the passage, and a second side of the cap is retained between the first distal surface and the first seat; and
   a retainer configured to contact a second seat, wherein both the retainer and the second seat are disposed within the passage; and
   wherein the threaded section of the at least one fastener can be received and retained in the internally threaded passage of the shank to operably couple the first self-contained assembly and the at least one second self-contained assembly.

2. The mounting assembly of claim 1, further comprising a wear attenuator operably coupled to the first side of the washer about the at least one fastener opening.

3. The mounting assembly of claim 1 wherein the biasing element includes a set of wave springs.

4. The mounting assembly of claim 1 wherein the washer comprises a pair of spaced fastener openings and the at least one washer comprises two washers, the at least one bushing comprises two bushings, and the at least one fastener comprises two fasteners.

5. The mounting assembly of claim 4 wherein the at least one second self-contained assembly comprises two second self-contained assemblies.

6. The mounting assembly of claim 4, further comprising a wire or cable configured to retain an upper portion of the two fasteners.

7. The mounting assembly of claim 1 wherein the shank of the floating body is smaller in width than the passage of the boss and the floating body is configured to axially move therein.

8. The mounting assembly of claim 7 wherein the retainer is spaced apart from the cap of the floating body when the cap abuts the first seat.

9. The mounting assembly of claim 7, further comprising a wear attenuator operably coupled to the second distal surface of the boss.

10. The mounting assembly of claim 1 wherein the first self-contained assembly is configured to operably couple with two second self-contained assemblies.

11. A method of mounting two components via the mounting assembly of claim 1, the method comprising:
   placing the first self-contained assembly adjacent a first side of a first component the first self-contained assembly, comprising:
   the washer having the body defining the first side and the second side and including the at least one fastener opening extending through the body from the first side to the second side;

the at least one washer, wherein the at least one washer is a set of washers, each washer of the set of washers including a peripheral lip and a central hub having a fastener opening;

the biasing element located between the second side of the washer and each washer of the set of washers;

at least one bushing having the internally threaded section; and at least one fastener having the threaded section, the threaded section configured to pass through the at least one fastener opening, the fastener opening, and be retained in the internally threaded section of the at least one bushing and having the length that passed through the at least one bushing and provides for a pre-load force from the biasing element;

placing the at least one second self-contained assembly adjacent a second side of the first component, the at least one second self-contained assembly comprising:

the boss having the body extending from the first distal surface to the second distal surface, the passage extends through the body of the boss from the first distal surface to the second distal surface, the first seat is defined within the passage; and the floating body having the shank and the cap extending from the upper portion of the shank, the internally threaded passage extends through the shank and cap the shank located within the passage and a first side of the cap configured to abut the first seat defined within the passage, and a second side of the cap is retained between the first distal surface and the first seat; and threading the fastener into the internally threaded passage of the shank to operably couple the first self-contained assembly and the at least one second self-contained assembly about the first component; and wherein the first side of the washer is adjacent the first side of the first component, the first component includes an opening through which the fastener and at least a portion of the shank extends.

12. The method of claim 11, further comprising operably coupling the boss to a second component.

13. The method of claim 12 wherein the first component is a fan casing of a turbine engine and the second component is a surface cooler.

14. The mounting assembly of claim 1, wherein the retainer located between the first seat and the first distal surface.

15. A fan casing assembly, comprising:

an annular fan casing having a peripheral wall and a set of fan casing fastener openings passing through the peripheral wall;

an annular surface cooler having a first surface confronting the peripheral wall; and a mounting assembly having a lower portion generally retained between the first surface of the annular surface cooler and the peripheral wall and having a floating body extending through the set of fan casing fastener openings and an upper portion located radially exterior of the annular fan casing and operably coupled to the lower portion, wherein the mounting assembly is configured to provide a fixed connection for dynamic loading, a flexible connection for thermal loading, and shifting during installation to allow for tolerance mismatch of the annular fan casing and annular surface cooler;

wherein the mounting assembly includes a first self-contained assembly, comprising:

a washer having a body defining a first side facing an exterior of the peripheral wall of the annular fan casing and a second side and including at least one fastener opening extending through the body from the first side to the second side;

at least one washer including a peripheral lip and a central hub having a fastener opening;

a biasing element located between the second side of the washer and the at least one washer;

at least one bushing having an internally threaded section; and at least one fastener having a threaded section, the threaded section configured to pass through the at least one fastener opening, the fastener opening, and be retained in the internally threaded section of the at least one bushing and having a length that passed through the at least one bushing and provides for a pre-load force; and at least one second self-contained assembly, comprising:

a boss having a body extending from a first distal surface to a second distal surface, a passage of the boss extends through the body of the boss from the first distal surface to the second distal surface, a first seat is defined within the passage, the first distal surface operably coupled to the first surface of the annular surface cooler;

a floating body having a shank configured to pass through one of the set of fan casing fastener openings and a cap extending from an upper portion of the shank, an internally threaded passage extends through the shank and cap, the shank located within the passage and a first side of the cap configured to abut the first seat defined within the passage, and a second side of the cap is retained between the first distal surface and the first seat; and a retainer washer configured to contact a second seat, wherein both the retainer washer and the second seat are disposed within the passage; and wherein the threaded section of the at least one fastener can be received and retained in the internally threaded passage of the shank to operably couple the first self-contained assembly and the at least one second self-contained assembly.

16. The fan casing assembly of claim 15 wherein the at least one second self-contained assembly comprises two second self-contained assemblies.

17. The fan casing assembly of claim 15 wherein the shank of the floating body is smaller in width than the passage of the boss and the floating body is configured to axially move therein.

18. The fan casing assembly of claim 15 wherein the biasing element includes a set of wave springs.

19. The fan casing assembly of claim 15, further comprising at least one wear attenuator located between at least one of the fan casing and the boss or the fan casing and the first side of the washer.

* * * * *

UNITED STATES PATENT AND TRADEMARK OFFICE
CERTIFICATE OF CORRECTION

| | | |
|---|---|---|
| PATENT NO. | : 11,143,105 B2 | Page 1 of 1 |
| APPLICATION NO. | : 16/225063 | |
| DATED | : October 12, 2021 | |
| INVENTOR(S) | : Luschek et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this
Fourth Day of July, 2023

Katherine Kelly Vidal
*Director of the United States Patent and Trademark Office*